June 15, 1954  J. V. MANNION  2,681,034
MOUNTING FOR SIGHT GLASS ASSEMBLIES
Filed Feb. 23, 1951  2 Sheets-Sheet 1
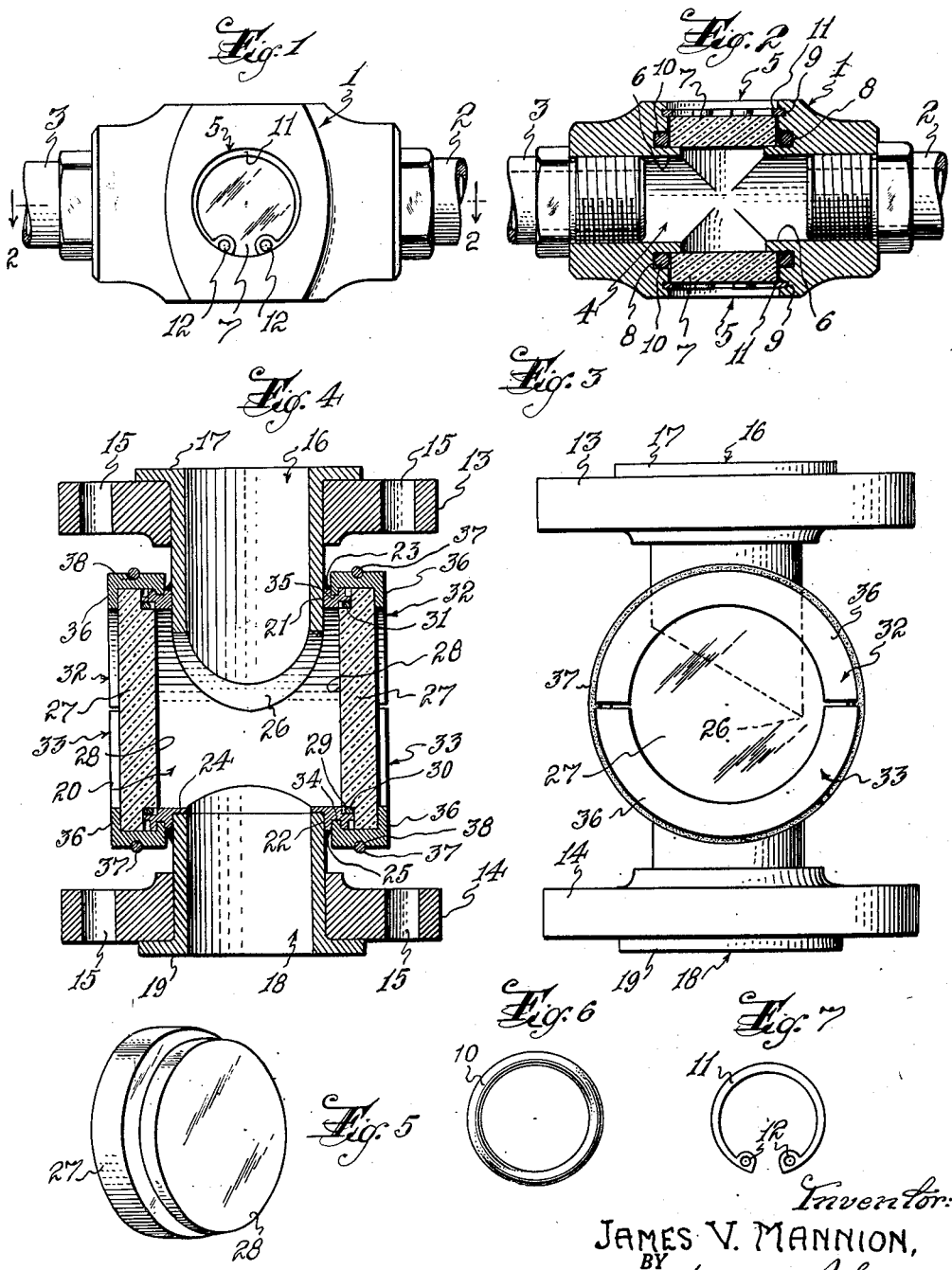
Inventor:
JAMES V. MANNION,
BY

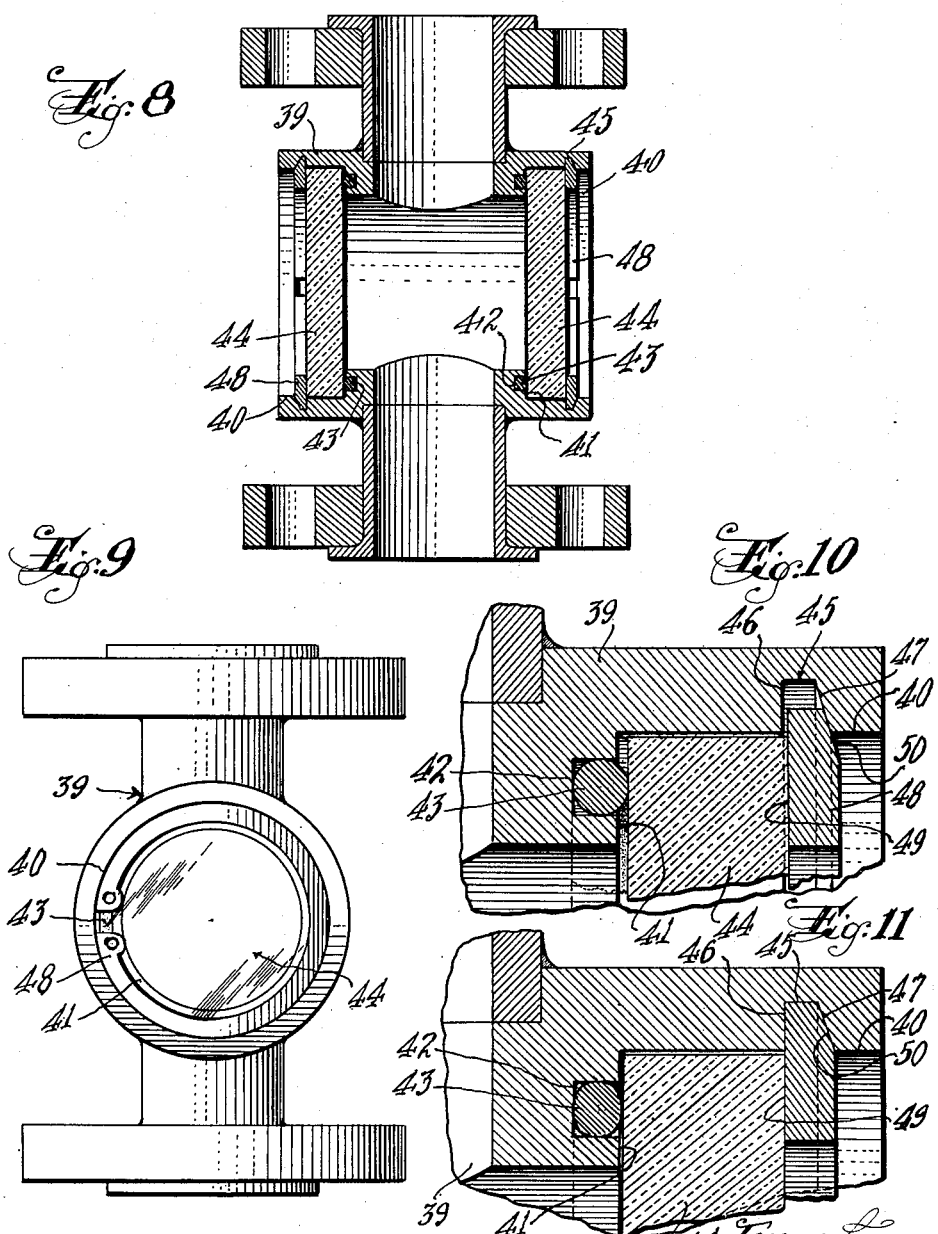

Patented June 15, 1954

2,681,034

UNITED STATES PATENT OFFICE 2,681,034

MOUNTING FOR SIGHT GLASS ASSEMBLIES

James V. Mannion, Westfield, N. J., assignor to Trinity Equipment Corporation, Roselle Park, N. J., a corporation of New Jersey Application February 23, 1951, Serial No. 212,305

7 Claims. (Cl. 116—117)

This invention relates to sight glass assemblies for use in fluid flow indicators and the like.

Heretofore it has been the practice to provide sight flow indicators and the like with disc and reflex type glasses held in position in openings in a casing between compressible gaskets which rest on the inner and outer flat surfaces of the glass and are tightened by flange bolts and the like. Glass breakage is frequent due to the excessive pressure necessarily directed against the surface of the glass when the bolts are tightened in providing a seal, particularly when the bolts are unequally tightened.

A prime object of the invention is to provide a sight glass assembly wherein a tight seal between the glass and the walls of the opening in the casing can be obtained with a minimum of mechanical pressure or strain on the glass.

Another object is to provide a sight glass assembly of this character wherein the contact of the glass with the gasket and the pressure on the glass are at the edge or periphery of the glass rather than on the face of the glass.

Other objects of the present invention are to provide a mounting for a sight glass assembly wherein compression of glass causing non-uniform stress is eliminated; higher pressure and vacuum are provided; weight is reduced; appearance improved, smaller glasses for equal viewing area may be used; fastening elements such as bolts and screws are eliminated; and the costs of manufacture and maintenance are reduced.

The invention will be better understood from the description thereof to follow taken in connection with the accompanying drawing in which—

Figure 1 is an elevational side view of one type of fluid flow indicator with a sight glass assembly embodying one form of the invention.

Figure 2 is a horizontal sectional view taken on the plane of the line 2—2 of Figure 1.

Figure 3 is a side elevational view of a different type of fluid flow indicator with a sight glass assembly embodying a modified form of the invention.

Figure 4 is a vertical sectional view thereof.

Figure 5 is a perspective view of the sight glass of Figure 3.

Figure 6 is a plan view of the inner ring gasket of Figure 1.

Figure 7 is a plan view of the outer split ring gasket of Figure 1.

Figure 8 is a view similar to Figure 4 showing a modification of the invention.

Figure 9 is a view like Figure 3 of the modification shown in Figure 8.

Figure 10 is a clearly enlarged fragmentary vertical sectional view showing the glass and gasket partially assembled in the casing, and Figure 11 is a similar view showing the parts in completely assembled relation.

Specifically describing the embodiment of the invention illustrated in Figures 1 and 2, a fluid flow indicator including a tubular body or fitting 1 has one end connected to a fluid supply pipe 2 and has its other end connected to a discharge pipe 3, whereby fluid flows through the central passage 4 in the tubular body. The tubular body is flat sided and the proposed side wall portions are provided with opposed openings 5 communicating with the central passage 4 in the body through which the fluid flows. The diameter of each opening at its inner end is reduced forming a flat shoulder 6 which provides a support against which the inner surface of a disc-shaped sight glass 7 rests. The wall of each opening 5 is formed with an annular groove 8, adjacent the inner end thereof and with an annular groove 9 adjacent the outer end thereof.

Mounted in the annular groove 8 is an annular gasket member or ring gasket 10 of the so-called O ring type formed of any suitable resilient material. The diameter of the opening in the gasket is slightly smaller than the diameter of the main portion of the opening 5 in the tubular body whereby the inner periphery of said gasket extends into said opening and is substantially of the same diameter as the diameter of the sight glass 7 so that when said sight glass is forced through the gasket to its seat on the shoulder 6 the gasket 10 is compressed slightly between the sight glass, the shoulder 6 and wall of the annular groove 8. The O-ring gasket is compressed in additional amount by means of fluid pressure within the indicator since fluid under pressure in the indicator finds its way therefrom into annular groove 8 to distort the O-ring gasket thereby effecting such additional compression to produce a tight connection between the sight glass and body 1 and so prevent leakage at this point and hold the glass securely in position.

A retaining split ring gasket 11 is mounted in each countersunk portion 9 in engagement with the outer surface of the sight glass for clamping the sight glass in position. The free ends of the split ring 11 are enlarged and formed with openings 12 to permit a tool to be used in contracting the ring in mounting an demounting the same.

In Figures 3 and 4, a modified form of sight glass assembly is illustrated as applied to a different type of fluid flow indicator, which indicator is vertically disposed and includes an upper horizontally disposed flanged ring 13 and a lower horizontally disposed flanged ring 14. Both rings are formed with stud bolt openings 15 whereby the device may be bolted in position to the flanged ends of sections of a closed line or to a container through which fluid flows.

An inlet nozzle comprising a tubular body 16 is fitted in the opening in the upper ring 13 and extends downwardly therethrough and is secured to the ring by an annular flange 17 formed on its outer end. An outlet nozzle comprising a tubular body 18 open at both ends is fitted in and extends inwardly through the opening in the bottom ring 14 and is secured to the ring by a flange 19 formed on its outer end.

The inlet and outlet nozzles are connected together by a coupling structure comprising a horizontally disposed tubular body 20 open at both ends and formed with a top opening 21 and a bottom opening 22. The tubular body 16 of the inlet nozzle extends through the top opening 21 into the interior of the coupling structure and is rigidly secured to the edge wall of said opening by welding as indicated at 23. The tubular body 18 of the outlet nozzle extends into the opening 22 in the bottom of the tubular body 20 of the coupling structure and its inner straight end abuts against a flat shoulder 24 formed on the coupling structure around the inner end of the opening. The tubular body of the outlet nozzle is fixed to the coupling structure by welding as indicated at 25. The nozzles are fixed in alinement in the coupling structure and the inner end of the tubular body 16 of the inlet nozzle is cut at an angle to the horizontal as shown in dotted lines in Figure 3 forming a drip lip 26 whereby the fluid may drip downwardly into and through the outlet nozzle below.

An improved sight glass assembly is mounted in each of the open ends of the tubular body 20 of the coupling structure. The assembly includes a sight glass having a substantially disc-shaped body 27 cut away at one end to form a reduced portion 28. The reduced portion is positioned in the opening at the end of the tubular body 20, which body at said point is undercut as indicated at 29. A ring gasket member 30 of the so-called O-ring type, similar to ring 10 of the form shown in Figure 1, is mounted in the undercut portion and compressed between the periphery 31 of the reduced portion of the sight glass and the tubular wall 20 of the coupling structure thereby providing a fluid tight connection between the sight glass and the tubular body of the coupling structure. A split clamping ring comprising an upper section 32 and a lower section 33 is positioned around in engagement with the peripheral edge of the sight glass 27. Each clamping ring section has an inner flange 34 seated in a groove 35 formed in the outer periphery of the wall 24 adjacent each end, and each clamping ring section has an outer flange 36 extending over the outer surface of the sight glass. A retaining split ring 37 of spring material encircling the ring sections 32 and 33 and seated in grooves 38 formed on their outer peripheries serves to press the sections radially toward each other and thereby clamp the sight glass securely in position.

A modification of the invention is shown in Figures 8 to 10 inclusive where the body or casing 39 may be in general the same as that shown in Figures 4 and 5 with the exception of the openings or recesses in which the sight glasses are mounted. The casing has two sight glass openings 40 the wall of each of which has an inwardly projecting annular shoulder 41 the plane of which is disposed transversely of the opening and which has an annular groove 42 for a gasket 43 which is preferably of the O ring type, the cross sectional diameter of the O ring and the dimensions of the groove being so related that the ring projects from the groove beyond the plane of the shoulder 41 as best shown in Figure 10. A sight glass 44 is loosely fitted into each of the openings 40 and the inner circumferential wall of each opening has an annular groove 45 the inner wall 46 of which is parallel with the base of the groove 42 while the outer wall 47 is beveled or approximately frusto-conical with its larger end disposed at the base of the groove. The wall 46 is spaced from the projecting portion of the O ring a distance slightly less than the thickness of the sight glass 44 so that during assembly of the parts, the edge of the outer face of the glass extends outwardly beyond the wall 46 of the groove as shown in Figure 10.

For clamping the glass in position, a split spring ring 48 is seated in the groove 45, said ring having one face 49 to abut the outer face of the glass and having a frusto-conical surface 50 on its other face corresponding in shape to the surface 47 of the groove 45. In assembling the parts, the split locking ring 48 is initially contracted and slipped into the sight glass opening 40 against the face of the glass, whereupon the split locking ring is expanded into the groove 45, so that the sliding of the surface 50 of the ring on the surface 47 of the groove 45 will cause the sight glass 44 to be pushed into the opening and into tight contact with the O ring which is at the same time slightly compressed and deformed into tight contact with the walls of the groove 42, as best shown in Figure 11. In this form of the invention, and the pressure and strain are uniformly distributed so that the possibility of fracture of the glass is practically eliminated. Only a slight pressure need be applied to the surface of the glass to insure a tight seal which is effected by means of fluid pressure from within the casing in the same manner as described herein in connection with the first form of my invention.

From the foregoing it will be seen that due to the constructions shown and described, I have provided means for securing a sight glass within the body of a flow indicator in such a way that a tight connection will be had between the body of the flow indicator and the sight glass and with a minimum of pressure and strains that might tend to fracture the glass.

Furthermore, a tighter joint between the glass and the casing or body can be obtained easily and quickly, and the necessity for bolts or similar fastening elements is eliminated; a minimum of maintenance is required, appearance is improved and a given viewing area can be obtained with smaller glasses than have been required heretofore.

While the invention is illustrated as mounted in different types of fluid flow indicators, the improved sight glass assembly may just as readily be applied to thru vision fittings, such as gauge glasses, rotary type flow indicators, drip and sight tubes, observation ports and fittings, reflex gauge glasses, sight windows, check valve flow indicators, and liquid level glasses.

It will also be understood that changes in details of construction might be made without departing from the principle of the invention.

What I claim is:

1. A mounting for a sight glass assembly for a fluid flow indicator comprising a body forming a tubular fitting having a passage therethrough with the passage therethrough communicating with a side opening in the fitting, said side opening having appreciable depth, an annular shoulder formed on the fitting around the inner end of said opening and extending inwardly into said opening, said opening being formed with an undercut portion adjacent said shoulder, a sight glass fitted in said opening and resting on said shoulder, means for retaining the glass in the opening and a resilient O-ring type gasket in said undercut portion pressing radially against the peripheral edge of said sight glass, the gasket being distorted by fluid pressure from within the interior of the body to form a fluid tight connection between the glass and the fitting.

2. A mounting for a sight glass assembly for a fluid flow indicator comprising a body forming a tubular fitting having a passage therethrough with the passage therethrough communicating with a side opening in the fitting, said side opening having appreciable depth, an annular shoulder formed on the fitting around the inner end of the opening and extending inwardly into said opening, said opening being formed with an undercut portion adjacent said shoulder, and with an undercut portion adjacent its outer end, a sight glass fitted in said opening and resting on said shoulder, a split ring in the undercut portion adjacent the outer end and a resilient O-ring type gasket in said undercut portion adjacent the shoulder pressing radially against the peripheral edge of said sight glass, the gasket being distorted by fluid pressure from within the interior of the body to form a fluid tight connection between the glass and the fitting.

3. A mounting for a sight glass assembly for a fluid flow indicator comprising a tubular fitting with a passage therethrough having an opening at one end for connection to a fluid supply pipe line and an opening at its opposite end for connection to a discharge pipe, the passage in the fitting communicating with opposed side openings therein, having appreciable depth, an annular shoulder formed on the fitting at the inner end of each side opening, the wall of each side opening being undercut adjacent said shoulder and being undercut adjacent its outer end, a resilient O type ring mounted in the undercut portion adjacent the shoulder and compressed between the opposed walls of the undercut portion, a sight glass fitted in each side opening and resting on the annular shoulder at its inner end, said glass compressing the O ring between the wall of the undercut portion and said glass, the O-ring being additionally compressed and distorted by fluid pressure from within the fitting to form a fluid tight connection between the glass and fitting, and a split retaining ring in the outer undercut portion.

4. A sight glass assembly including a hollow body having an inlet and an outlet for a fluid, a wall of the body having an opening communicating with the interior of the body and having an annular groove in a wall of the opening and concentric with said opening, a sight glass disc fitted in said opening and an annular resilient O-ring type gasket seated in said groove and in contact with the glass and distorted by fluid pressure from within the interior of the body to form a fluid tight joint between the glass and wall of the opening, and means for locking said sight glass disc in said opening.

5. A sight glass assembly as defined in claim 4, wherein said resilient gasket encircles and presses against the peripheral edge of the wall of the sight glass disc.

6. A sight glass assembly as defined in claim 4, where the last-named means comprises a second annular groove in said opening in spaced relation to the first-mentioned groove and the split ring seated in said second annular groove and abutting the outer face of said sight glass disc.

7. A sight glass assembly as defined in claim 4, wherein the inner face of said sight glass disc abuts said resilient ring and the last-named means comprises a second annular groove in the wall of said opening, and a split ring seated in said second annular groove and abutting the outer face of said sight glass disc, said second annular groove and said split ring have cross-sectional contours to cause said split ring to push said sight glass disc against said resilient ring as the split ring is expanded into said second annular groove.

References Cited in the file of this patent

UNITED STATES PATENTS

| Number | Name | Date |
|--------|------|------|
| 820,922 | Einsele | May 15, 1906 |
| 1,172,039 | Ottesen | Feb. 15, 1916 |
| 2,294,175 | Graesser et al. | Aug. 25, 1942 |
| 2,325,415 | McKinley | July 27, 1943 |
| 2,331,917 | Kocher | Oct. 19, 1943 |
| 2,368,105 | Berge | Jan. 30, 1945 |
| 2,505,118 | Holmes | Apr. 25, 1950 |